Nov. 12, 1963  J. P. MERRILL  3,110,055
SWEEPER SCRUBBER
Filed Feb. 26, 1962
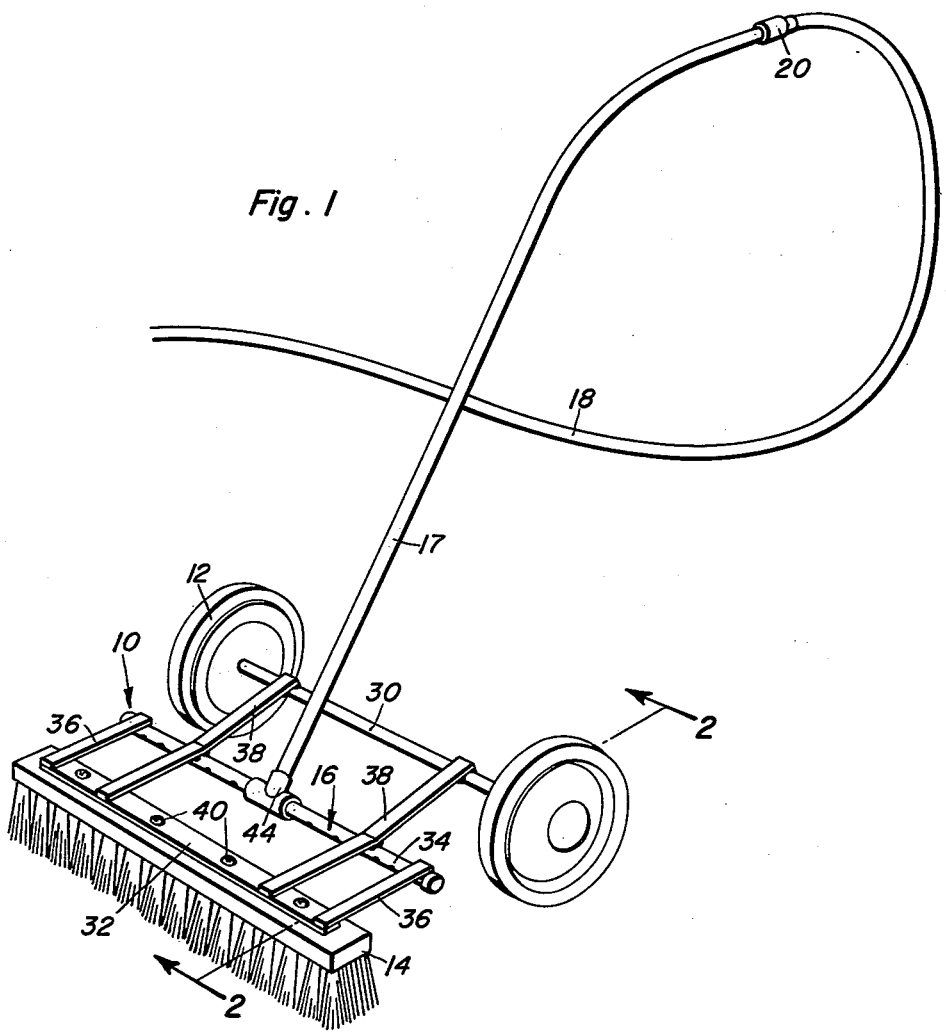
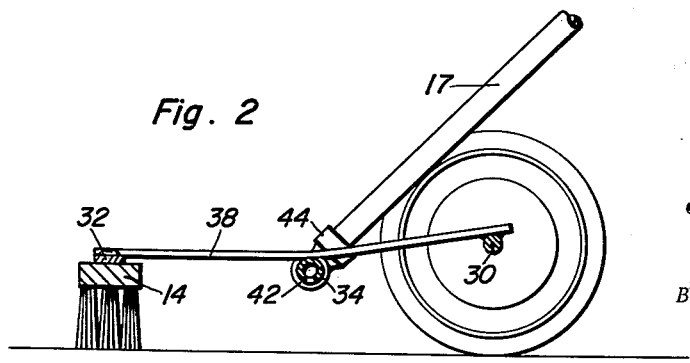
Jesse P. Merrill
INVENTOR.

United States Patent Office 3,110,055
Patented Nov. 12, 1963

3,110,055
SWEEPER SCRUBBER
Jesse P. Merrill, 1108 Avondale Road, Montgomery, Ala.
Filed Feb. 26, 1962, Ser. No. 175,746
7 Claims. (Cl. 15—544)

This invention comprises a novel and useful sweeper scrubber and more specifically pertains to a combination scrubber and sweeper implement particularly adapted to facilitate the cleansing of roads, sidewalks, floors and the like by sweeping or brushing either alone or in combination with the spraying of water or a cleanser thereon to facilitate removal of foreign matter from the surface.

A primary object of this invention is to provide a cleansing implement which shall be readily mobile in character and easily handled and which shall be capable of selectively performing efficiently the operations of sweeping or scrubbing a floor either in a dry condition or accompanied by the application of water or cleansing agent to the floor during the sweeping and scrubbing operation.

A further object of the invention is to provide a device in accordance with the foregoing object which shall be of extremely light weight, of inexpensive construction and yet shall have superior qualities as to rigidity of construction maneuverability and accessibility for inspection or replacement of any of its components.

Yet another object of the invention is to provide a device in accordance with the preceding objects which shall be capable of being attached to a conventional garden hose or the like so that scrubbing water may be readily applied to the spray means of the device throughout the range of movement of the latter.

A still further object of the invention is to provide a cleaning implement in accordance with the preceding object which shall include a pair of supporting wheels at the rear end of the device with a scrub brush at the front end thereof and means to effect ready tilting of the frame of the apparatus about the axle of the support wheels in order to lift the scrub brush completely from the surface or to impart any desired fraction of the weight of the apparatus to the scrub brush during its use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing a preferred embodiment of the scrubbing and sweeping implement in accordance with this invention; and FIGURE 2 is a vertical transverse sectional view taken substantially upon the plane indicated by section line 2—2 of FIGURE 1.

The cleaning implement in accordance with this invention consists of a mobile support frame indicated generally by the numeral 10 which is provided with mounting wheels 12 at the rear portion thereof, a scrubbing brush 14 at the front end thereof, and a spray means 16 between the wheels and the brush together with a hollow handle 17 which not only serves the purpose of a handle to maneuver the apparatus but also serves for connection to a source of water under pressure such as a garden hose or the like 18 by means of a detachable coupling 20. In operation the device may be manipulated by use of the handle 17 in any conventional manner so as to use the brush 14 to sweep a surface over which the device passes. In addition, by supplying water from the hose 18 and through the handle 17, the spray means 16 may be caused to apply a spray of water or other cleansing agent to the surface adjacent to the brush 14 so as to assist the latter in scrubbing and removing hardened or encrusted foreign matter from the surface being cleaned.

Referring now more specifically to the improved construction of the apparatus it will be observed that the open frame support or support frame 10 includes parallel transverse members which are rigidly connected together by longitudinal members. Thus, the parallel transverse members include a preferably solid rear member 30 consisting of a solid bar comprising a rear axle upon which the support wheels 12 are journalled, a flat bar or plate 32 comprising a forward transverse member together with an intermediate hollow tubular member 34. It will be observed that the forward member 32 and the intermediate member 34 are rigidly secured together by longitudinal brace means in the form of bars or straps 36 which may be welded to the top surfaces of the forward and intermediate members at the extremities of the latter. The rear axle or rear transverse member 30 is also rigidly attached to the other transverse members by means of the longitudinal beams or members 38 which are fixedly secured as by welding to the forward member 32, to the rear axle 30 and to the intermediate member 34 upon the top surfaces of these members. Preferably, as indicated more clearly in FIGURE 2, the longitudinal members 38 are bent at their midportions or where they are secured to the intermediate transverse member 34 so that the forward and rearward portions of the longitudinal members 38 are slightly angulated. As a result of this construction the transverse intermediate member 34 comprising the spray means is located somewhat below the plane which contains the transverse axes of the members 32 and 30. This results in positioning the axle 30 a little higher than the horizontal plane containing the transverse axes of the members 32 and 34.

The brush 14 is of any conventional design and is removably secured as by fastening screws 40 to the underside of the forward transverse members 32 in a manner which will permit ready inspection of the brush and ready replacement of the same as desired.

As regards the operation of the brush it will be seen that by use of the handle 16 additional downward pressure besides the weight of the brush itself may be applied to maintain the brush firmly against the surface being scrubbed or cleaned, or the brush may be partially lifted to lessen this weight or may be entirely lifted from the surface when it is desired merely to move the device over the surfaces without a scrubbing operation being performed thereon.

The spray means 16 consists of the hollow tubular intermediate member 34 which upon its bottom surface is provided with a plurality of longitudinally spaced discharge orifices 42 positioned to direct the water to form a spray downwardly therefrom and across substantially the entire length of the brush 14. The hollow handle 17 is secured by a suitable connection at 44 to the intermediate member 34, preferably intermediate the ends of the latter and serves to supply water or other cleaning agent through the handle into the interior of the member 34 for discharge through the orifices 42 in the form of a spray.

Although there has been illustrated in FIGURE 1 of the drawings the use of the device in connection with a garden hose for supplying water as the cleaning medium through the spray means, it will be appreciated that any other fluid may be supplied to the handle 17 either by hose 18 or from a container carried upon the device itself.

The device lends itself to use either as a scrubbing brush alone with the aforementioned versatility of the pressure to be applied by the brush to the surface being scrubbed or as a spraying device alone when the brush is lifted off of the ground by pushing down the handle 16 and causing the entire support frame to be pivoted vertically upwardly about the axle 30, or as a combination of spraying and scrubbing means.

The open frame carriage or support frame 10 is of a light inexpensive construction and one which permits easy inspection of the spray or brush components of the apparatus. Yet with this lightweight construction there is provided great rigidity of construction.

It is to be noted that although varying widths of brush 14 may be employed it is preferred that the length of the brush shall exceed the space between the wheels 12 in order that the brush may completely clean the surface over which the wheels travel. However, the device may be either used with a pushing or pulling motion as may be desired.

The foregoing is considered as illustrative only of the principles of the invention. Further, since numerous modifications and change will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination scrubber and sweeper comprising in combination a support frame comprising rigidly connected spaced, parallel front and rear transverse members and longitudinal members extending between said transverse members, support wheels journaled on said rear transverse member, a scrubbing brush carried by and depending from said front transverse member, water spray means mounted upon said frame between said wheels and brush and trailing said brush for directing water downwardly under pressure behind the brush and upon the surface swept by said brush and across the entire length of the latter, and a handle rigidly secured to said frame for propelling same over the surface and for swinging said frame upwardly and rearwardly on the wheels for elevating the brush to an inoperative position whereby said spray means may be selectively used independently of the brush for flushing the surface and washing therefrom matter which has been loosened by the brush.

2. The combination of claim 1 wherein said handle is tubular and comprises means for supplying water to said water spray means.

3. The combination of claim 2 wherein said water spray means includes a hollow member forming one of said transverse members and having longitudinally spaced, downwardly directed discharge orifices.

4. The combination of claim 1 wherein said water spray means includes a hollow member forming one of said transverse members and having longitudinally spaced, downwardly directed discharge orifices.

5. A combination scrubber and sweeper comprising, in combination, an open-frame support carriage including a rear transverse member constituting an axle having support wheels thereon, a forward transverse member and an intermediate transverse tubular member, said transverse members extending in spaced parallelism to each other, longitudinal members rigidly connecting said forward and intermediate members, an elongated, transversely extending scrubbing brush detachably secured to said forward member, said intermediate member having downwardly directed, spaced openings in its lower portion providing means for spraying water under pressure on a surface to be cleaned behind the brush for washing from said surface matter which has been loosened by the brush, a rigid, elongated tubular handle affixed at one end to an intermediate portion of the intermediate member in communication therewith, and a hose connected to the other end of the handle for connecting same to a source of water under pressure, said handle being upwardly and rearwardly inclined and providing means for propelling the carriage and for swinging same upwardly and rearwardly on the wheels for lifting the brush off the surface whereby the water spraying means may function independently of the brush for flushing the surface without scrubbing same.

6. The combination of claim 5 wherein said handle is hollow and constitutes part of said water supply means.

7. The combination of claim 5 wherein said brace means are disposed at the extremities of said forward and intermediate members.

References Cited in the file of this patent

UNITED STATES PATENTS

| | | |
|---|---|---|
| 492,487 | Reardon | Feb. 28, 1893 |
| 1,525,617 | Mills | Feb. 10, 1925 |
| 1,560,445 | Wagner | Nov. 3, 1925 |
| 1,916,430 | Larue | July 4, 1933 |
| 2,746,072 | Lumpkin | May 22, 1956 |